(12) United States Patent
Huang

(10) Patent No.: US 6,796,654 B2
(45) Date of Patent: Sep. 28, 2004

(54) SIZE-ADJUSTABLE LIGHT DISTRIBUTION MODULE FOR FLEXIBLY ADAPTABLE TO ILLUMINATION SYSTEM OF DIFFERENT LCD DISPLAYS

(75) Inventor: Junejei Huang, Taipei (TW)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 10/102,425

(22) Filed: Mar. 20, 2002

(65) Prior Publication Data

US 2002/0131020 A1 Sep. 19, 2002

Related U.S. Application Data

(60) Provisional application No. 60/277,188, filed on Mar. 19, 2001.

(51) Int. Cl.[7] .......................... G03B 21/14; G03B 21/20; G03B 21/26; G02F 1/1335
(52) U.S. Cl. ........................... 353/20; 353/30; 353/102; 349/9
(58) Field of Search ................... 353/20, 30, 31, 353/33, 34, 37, 38, 102; 349/5, 8, 9

(56) References Cited

U.S. PATENT DOCUMENTS 6,257,726 B1 * 7/2001 Okuyama .................. 353/20
6,273,569 B1 * 8/2001 Iechika et al. ............. 353/38
6,286,961 B1 * 9/2001 Ogawa ...................... 353/38
6,386,709 B1 * 5/2002 Seki ........................... 353/38
6,445,500 B1 * 9/2002 Itoh ........................... 359/487
6,513,953 B1 * 2/2003 Itoh ........................... 362/331

* cited by examiner

Primary Examiner—Russell Adams
Assistant Examiner—Melissa J Koval
(74) Attorney, Agent, or Firm—Bo-In Lin

(57) ABSTRACT

A light distribution module adaptable to a LCD display system includes a first lens array having a plurality of lenses for condensing a light beam into a plurality of polarization separation elements for separating and converting the light beam into a first set and a second set of uniformly polarized and mutually orthogonal beams. An image source size reduction lens reduces and focuses the first set and second set of uniformly polarized beams into a second lens array having twice as many lenses as the first lens array. The second lens array has a first and second set of lens arrays for receiving and converting the light beams with a first and second polarizations into a plurality of beams all with the first polarization to focus to a size-reduced LCD panel for image display.

4 Claims, 5 Drawing Sheets

SIZE-ADJUSTABLE LIGHT DISTRIBUTION MODULE FOR FLEXIBLY ADAPTABLE TO ILLUMINATION SYSTEM OF DIFFERENT LCD DISPLAYS

This Application claims a Priority Date of Mar. 19, 2001, benefited from a previously filed Provisional Application 60/277,188 filed on Mar. 19, 2001 by the same Applicants of this Patent Application.

FIELD OF THE INVENTION

The present invention relates generally to the image display systems. More particularly, this invention relates to an improved light delivery and distribution module with polarization conversion in the illumination system of a LCD projector implemented with or without micro lens that can be manufactured with compact size without requiring extra optical elements.

BACKGROUND OF THE INVENTION

Current state of the arts in designing and assembling image delivery modules suitable for implementation in different image display system are confronted with several technical limitations. Specifically, a LCD panel display system may require different size of image sizes depending on particular LCD panel designs. Typically, the image delivery module for each different type of LCD panel display has to be individually designed such that compatibility can be achieved. Such limitation often increases the cost of design and manufacture and often leads to lower productivity and poorer product reliability due to more complicate processes are necessary in each of these production cycles.

The limitation can be understood by examining a prior art patent issued to Itoh et. al. U.S. Pat. No. 5,986,809, entitled "Polarization conversion element, polarization illuminator, display using the same illuminator, and projection type display". This patent discloses an image illuminating device with polarization conversion. Referring to FIG. 1 for the polarizing illumination device 1 according to Itoh et al. The polarizing illuminating device includes a first optical element 200 that has a plurality of beam splitting lenses 201 faced with a plurality of condenser lenses 311 for condensing the incident beam to form a plurality of intermediate beams spatially separated from one another. Itoh et al. then applies a second optical element 300 for spatially separating each intermediate beam into two polarized beams and aligning the polarization directions of the polarized beams, thereby obtaining the same type of polarized beams. In the second optical element 300, a shading plate is placed to prevent light from directly entering a section corresponding to a reflecting plane of a polarizing separation unit array. Since the ability of separating the intermediate beam into two polarized beams is thereby enhanced, it is possible to perform conversion into the same type of polarized beams polarized in the same direction. These polarized beams with same polarization direction can be processed with high efficiency.

As that disclosed by Itoh et al. the polarizing illumination device 1 is advantageous in that randomly polarized beams emitted from the light source section 10 are converted into substantially one type of polarized beams. This is achieved by the polarized light generating device 20 that includes the first optical element 200 and the second optical element 300, and the illumination region can be illuminated uniformly with the light beams polarized in the same direction. Moreover, since the process of generating the polarized beams accompanies little loss of light, almost all the light emitted from the light source section can be directed to the illumination region, which provides extremely high light use efficiency. Furthermore, since the shading plate 370 is placed in the second optical element 300, other beams polarized in a different direction rarely mix into polarized beams of the same type for illuminating the illumination region. Therefore, when the polarizing illumination device is used as a device for illuminating a modulating device to produce a display using polarized beams for a liquid crystal device, it is possible to obviate a polarizing plate. This polarizing plate is often required to place on the side of the modulating device where the illumination light enters. Even if the polarizing plate is placed as is conventionally done, since the amount of light absorbed by the polarizing plate is extremely small, it is possible to reduce the size of a cooling device needed to minimize heat generation of the polarizing plate and the modulation device. Also, the structure of the polarizing illumination device has a beneficial effect, particularly in adopting a light source for emitting light beams having low parallelism in the apparatus.

Even with so many advantages as discussed above, Itoh's invention however suffers from the limitation that the size of the image source is fixed. The image source of fixed size can be quite limiting for compatibly adapting to application in different systems. One of such application may be a LCD panel with micro lenses wherein each micro lens may have a size smaller than the image source. Under that circumstance, Itoh's image delivery module as described in the above referenced patent cannot be adapted conveniently. In order to produce a smaller image source, either a smaller image source must be used or the distance between the image source and the lens system or the LCD panel has to increase. The display systems using Itoh's illuminating device become larger and often are inconvenient to implement for different LCD display systems. For example, FIG. 2 shows a LCD display system implemented with a light distribution module of Itoh. The LCD display system is implemented without the micro lenses due to the size of the image source.

Therefore, a need still exists in the art to provide an new and improved image delivery module to allow for flexible adjustment of the size of the image source. The flexibility to adjust the image source allows broader applications with requiring a longer optical path and larger volume when implemented for different image display systems. A compact and more economical application with simple design and configuration can therefore be achieved when flexibility adjusting the size of image source is provided.

SUMMARY OF THE PRESENT INVENTION

It is therefore an object of the present invention to provide an image delivery and polarization conversion system with improved design and configuration for flexibly adjusting the size of the image to overcome the aforementioned difficulties and limitations in the prior art.

Specifically, it is an object of the present invention to provide a new and improved image delivery and polarization conversion device by first converting the light source image beam into uniformed polarized beams and flexibly adjusting the size of the image source by either reducing or magnifying the image source. In a particular implementation the image source is focused and reduced to an array of condenser lenses for producing image suitable for implementing a display system with LCD panel either with or with micro-lenses.

Another object of this invention is provide new and improved image delivery system with polarization conversion and image source size adjustment without requiring to use specially designed optical or control mechanism such that the implementation may be realized economically at a low cost.

Another object of this invention is provide new and improved image delivery system with polarization conversion and image source size adjustment such that compact and reliable image display system can be conveniently and economically provided with sufficient flexibility with an universal adaptable and compatible image delivery module of this invention.

Briefly, in a preferred embodiment, the present invention includes a light distribution module adaptable to a LCD display system. The light distribution system includes a first lens array having a plurality of lenses for condensing a light beam into a plurality of polarization separation elements for separating converting the light beam into a first set and a second set of uniformly polarized and mutually orthogonal beams. The light distribution system further includes a image source size reduction means for reducing a size and focusing the first set and second set of uniformly polarized beams into a second lens array having twice as many lenses as the first lens array. The second lens array has a first set of lens array for receiving the light beams with a first polarization and a second set of lenses for receiving the light beams with a second polarization orthogonal to the first polarization. The lenses of the second set of lenses further have a half plate for converting the second polarization into the first polarization thus producing a plurality of beams all with the first polarization. The size-reduced and uniformly polarized beams are ready to project through another focusing lens to a LCD panel for image display.

These and other objects and advantages of the present invention will no doubt become obvious to those of ordinary skill in the art after having read the following detailed description of the preferred embodiment which is illustrated in the various drawing figures.

DETAILED DESCRIPTION OF THE INVENTION

Figure 1:
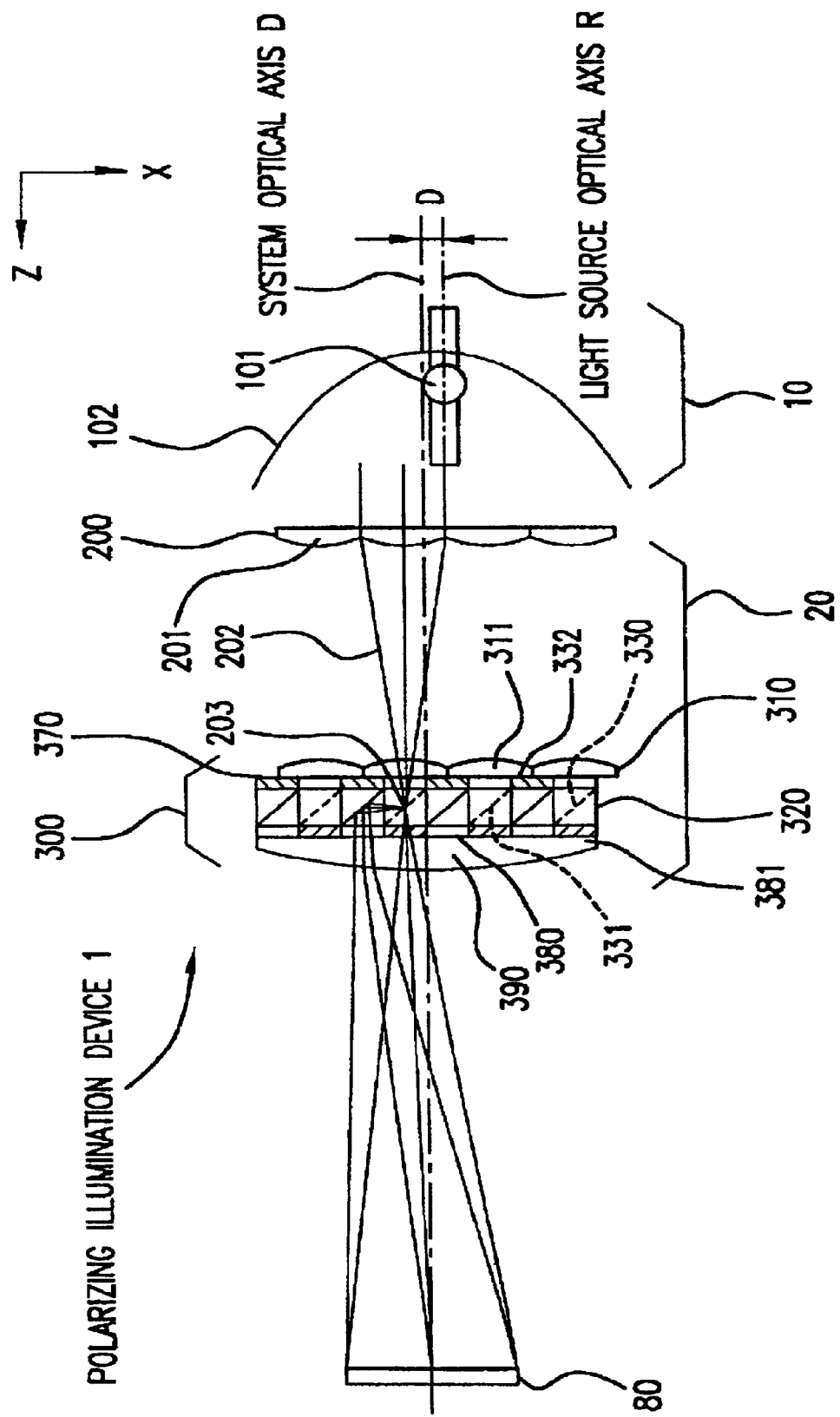
FIG. 1 is a diagram for illustrating a light distribution module with polarization conversion according to a prior art patent.
Figure 2:
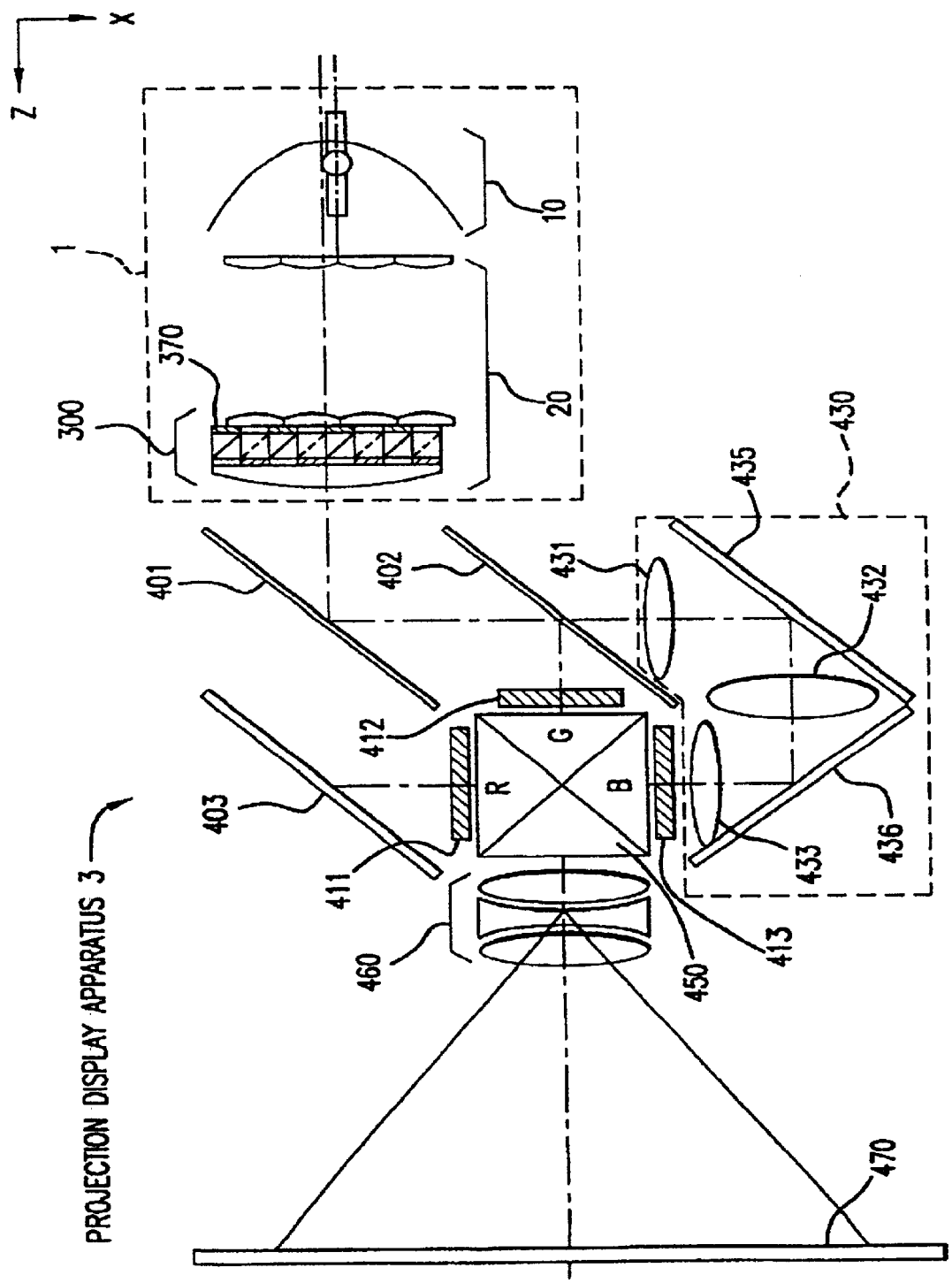
FIG. 2 is a diagram for illustrating the light distribution system of a prior art patent implemented in a LCD display system without micro lenses.
Figure 3:
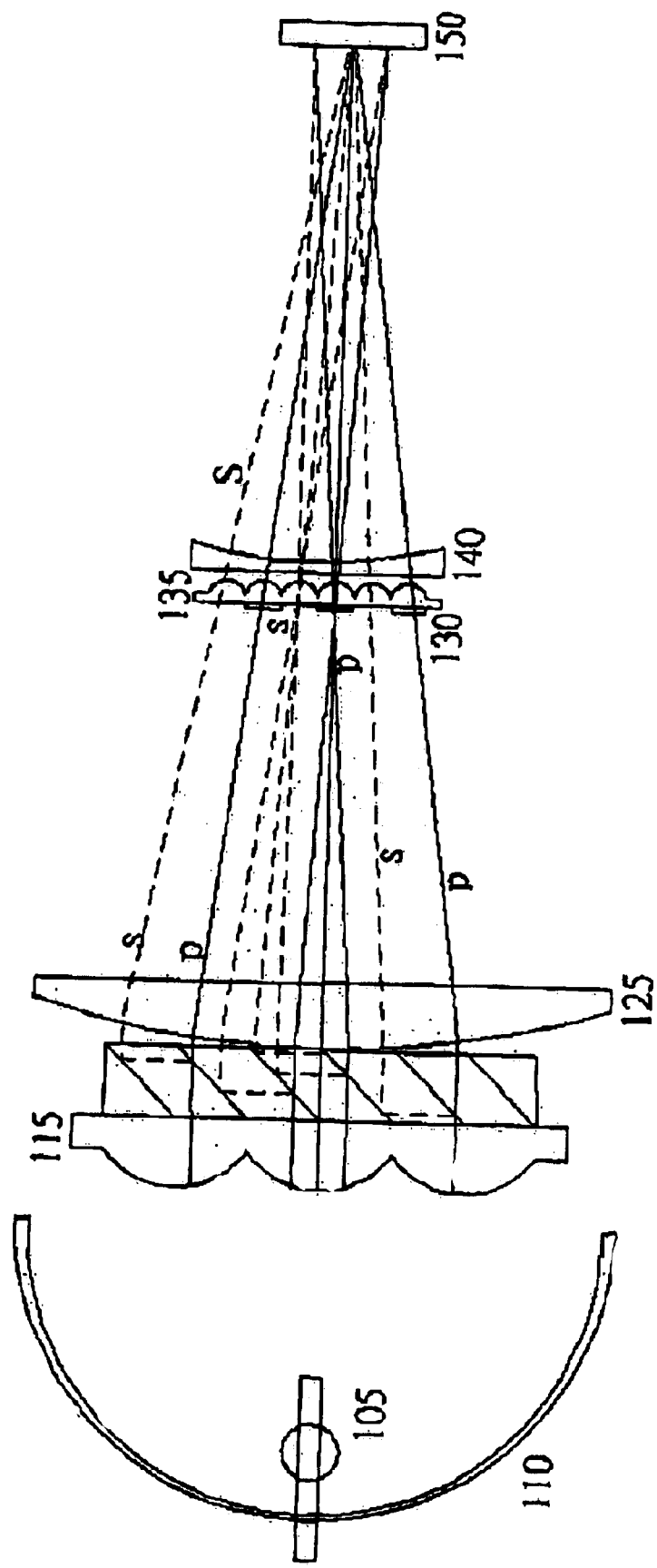
FIG. 3 is a diagram for illustrating a light distribution system of this invention.

Embodiments for illustrating how to make and carry out the present invention are described below with reference to drawings that shows the details of the structure and operation of embodiments. Referring to FIG. 3 for a schematic view that shows the principal parts for a polarizing light delivery module according to a preferred embodiment of this invention. The light delivery module includes a light source such as a lamp 105 disposed at a focal point on an optical central axis of a parabolic reflector 110. The parabolic reflector 110 reflects parallel light beams onto an input lens array, e.g., an array of condenser lenses 115 similar to that shown in FIG. 2 of U.S. Pat. No. 5,986,809. Each of the condenser lenses 115 condenses the light beams onto a corresponding polarization beam splitter (PBS) of a PBS array 120. The PBS array is a polarization separation array. Each of the polarization beam splitter transmits the S-polarization component of the beam and reflects the P-polarization component to a reflector for reflecting the P-polarization component to project toward a direction parallel to the optical path of the S-polarization component. A more details descriptions of the polarization separation array, e.g., the PBS array 120, can referred to U.S. Pat. No. 5,986,809, the disclosures of that Patent is hereby incorporated as reference for this Patent Application.

The PBS array 120 thus converts the randomly polarized beam into a first group of beams having an S-polarization and a second group of beams having a P-polarization. A positive lens 125 is employed for generating two sets of converging image from these two-group of beams. The first group of beams having an S-polarization is converged onto a first set of condenser lenses. A second group of beams having a P-polarization are converged to a second set of condenser lenses each having a half plate array 130. The half wave plate 130 is provided with a plurality of half-wave plates each placed on the optical path of a beam of onto a second lens array beam and P-polarized beam. A half-wave plate is placed on the optical path of the P-polarization beam to convert the beam with a P-polarization to an S-polarization. After passing through the half-wave plate 130, all the light beams are converted into beams of single polarization, i.e., S-polarization, and projected through an output lens array 135 onto a convex negative lens 140. The convex lens 140 projects the beam onto a liquid crystal display (LCD) surface 150 for displaying an image. Referring to FIG. 3C for a output lens array 135, which is similar to the input lens array 115 except that the number of condensing lenses are two-times as many as that of the input lens array. The positive lens 125 thus provides flexibility to converge the light beams for reducing the image size depending on requirements of application on different display systems. The positive lens 125 can be flexibly implemented as source image size adjusting means for reducing or magnifying the size of the image source when necessary. A light distribution system as shown in FIG. 3 thus provides more flexibility to compatibly adaptable to different display systems.

Figure 4A:
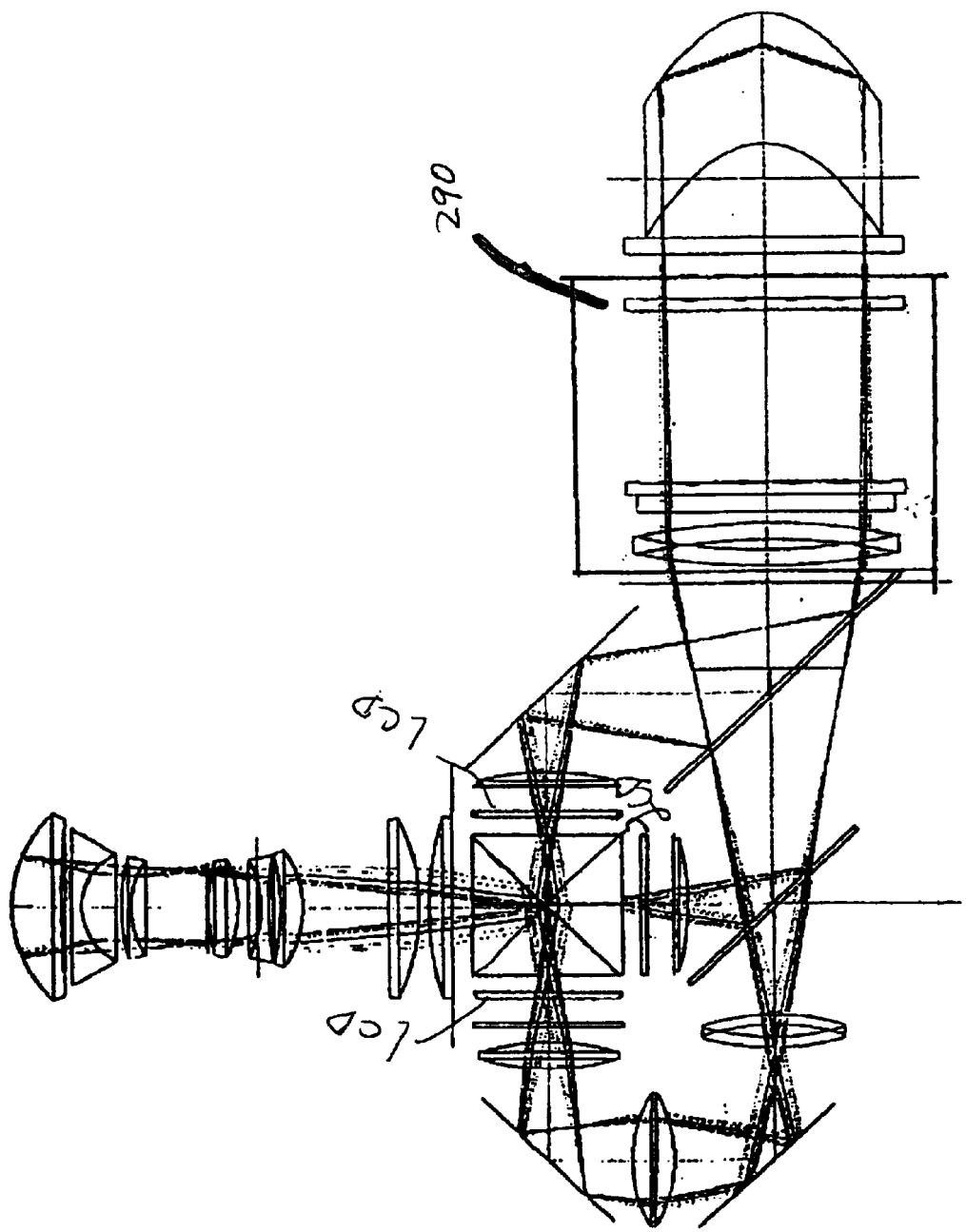
FIGS. 4A and 4B are diagram for illustrating the light distribution system of this invention implemented in a LCD display system without and with micro lenses respectively.
Figure 4B:
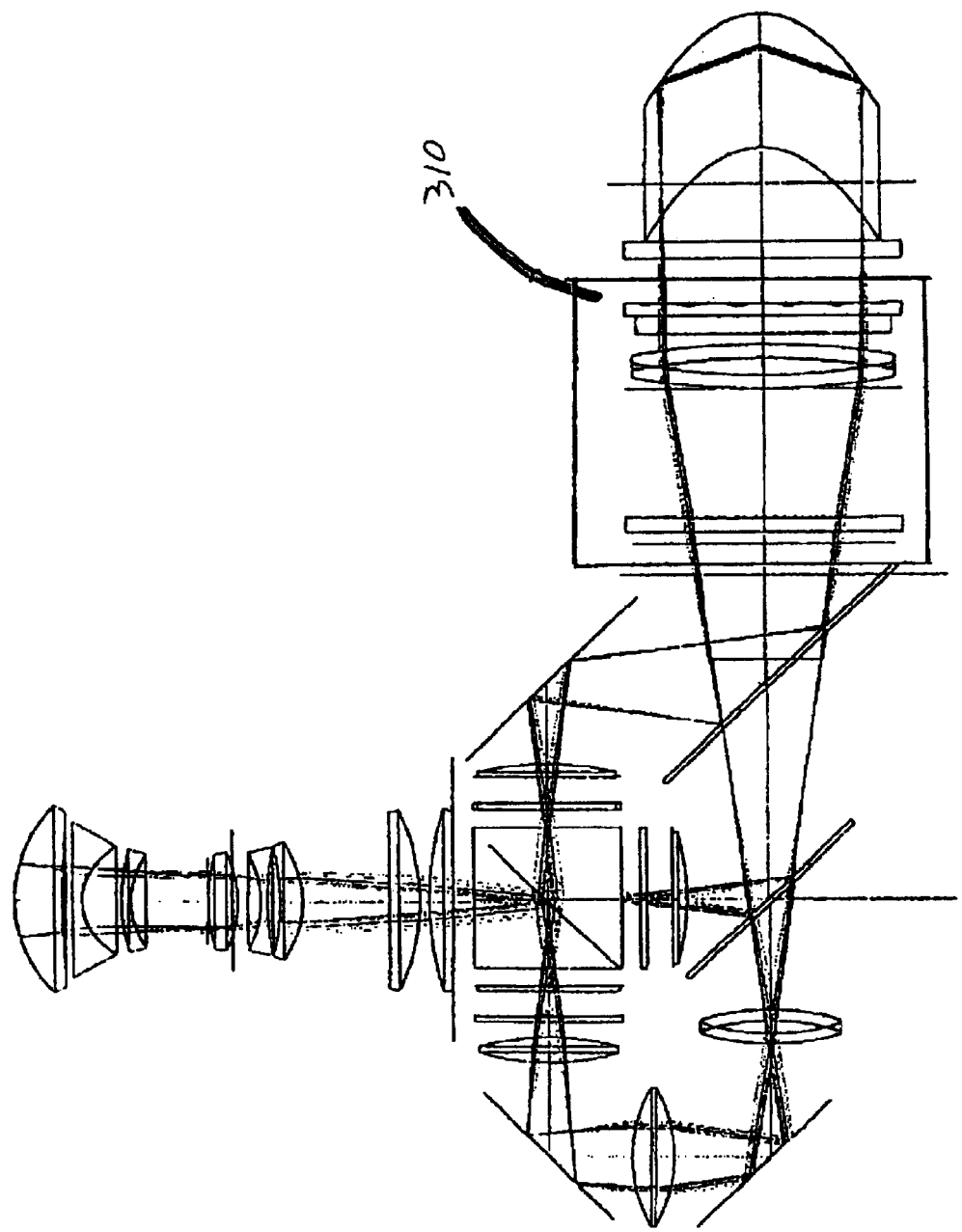

Referring to FIGS. 4A and 4B for a schematic diagram showing the light distribution module of FIG. 3 implemented in a liquid crystal display (LCD) image-display system without and with micro lens respectively. The light distribution module as shown as module 290 in FIG. 4A and module 310 in FIG. 4B is provided with an image source adjusting means, e.g., a positive lens 125 for flexibly reducing the size of the source image suitable for LCD panels with micro lenses. The details of the LCD display system other than the new and improved distribution system can be referred to another prior patent U.S. Pat. No. 5,626,409 and the disclosure of that patent is hereby incorporated as reference of this Patent Application. Detail descriptions of this projection display system, other than the light distribution system can therefore be referred to U.S. Pat. No. 5,626,409.

According to above descriptions, this invention discloses a light distribution system for receiving a light form a light source 105 and distributing the light to an image display projector 150. The light distribution system includes a polarization conversion means 120 for converting the light projected from said light source 105 into a first set of beams having a first polarization and second set of beams having a second polarization. The light distribution system further includes an image size adjusting means 125 for adjusting an image size projected from the first set of beams and the second set of beams. In a preferred embodiment, the image size adjusting means 125 is a positive lens for convergently projecting the first set of beams and the second set of beams toward the image display projector. In anther preferred embodiment, the image size adjusting means is a negative lens for divergently projecting the first set of beams and the second set of beams toward the image display projector. In another preferred embodiment, the light distribution system further includes a first set of condenser lenses 115 disposed between the light source 105 and the polarization converting means 120 to converge the light onto the polarization converting means. In another preferred embodiment, the light distribution system further includes a second set of condenser lenses 130 disposed between the polarization converting means 120 and the image display projector 150. The second set of condenser lenses further comprising a set of half-wave plate 130 for converting polarization of the second set of beams into the first polarization for projecting the first set of beams and second set of beams of a same polarization onto the image display projector. In a preferred embodiment, the polarization conversion means 120 comprising a polarization beam splitter (PBS) for converting the light into a first set of beams having a first polarization and second set of beams having a second polarization.

This invention further discloses a method for receiving a light into a light distribution system form a light source for distributing the light to an image display projector. The method includes a step of employing a polarization conversion means for converting the light into a first set of beams having a first polarization and second set of beams having a second polarization. The method further includes a second step of employing an image size adjusting means for adjusting an image size projected from the first set of beams and the second set of beams. In a preferred embodiment, the step of employing the image size adjusting means is a step of employing a positive lens for convergently projecting the first set of beams and the second set of beams toward the image display projector. In another preferred embodiment, the step of employing the image size adjusting means is a step of employing a positive lens for divergently projecting the first set of beams and the second set of beams toward the image display projector. In another preferred embodiment, the method further includes a step of disposing a first set of condenser lenses between the light source and the polarization converting means for converging the light onto the polarization converting means. In another preferred embodiment, the method further includes a step of disposing a second set of condenser lenses between the polarization converting means and the image display projector and configuring the second set of condenser lenses with a set of half-wave plate for converting a polarization of the second set of beams into the first polarization for projecting the first set of beams and second set of beams of a same polarization onto the image display projector. In another preferred embodiment, the step of employing the polarization conversion means comprising a step of employing a polarization beam splitter (PBS) for converting the light into a first set of beams having a first polarization and second set of beams having a second polarization.

Therefore, the present invention discloses an image delivery and polarization conversion system with improved design and configuration for flexibly adjusting the size of the image to overcome the difficulties and limitations encountered in the prior art. Specifically, the new and improved image delivery and polarization conversion device of this invention is achieved by first converting the light source image beam into uniformed polarized beams. And, the size of the image source is flexibly adjusted by either reducing or magnifying the image source. In a particular implementation the image source is focused and reduced to an array of condenser lenses for producing image suitable for implementing a display system with LCD panel either with or with micro-lenses. The image delivery system with polarization conversion and image source size adjustment is implemented without requiring to use specially designed optical or control mechanism and the implementation may be realized economically at a low cost. Also, the image delivery system with polarization conversion and image source size adjustment can be used to make compact and reliable image display system. Because the image delivery module of this invention has sufficient flexibility to be universal adaptable and compatible to different kinds of image display systems.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A light distribution system for receiving a collimated light form a light source and distributing the light to an image display projector comprising:

a polarization conversion means disposed immediately next to said light source for converting said collimated light projected from said light source into a first set of beams having a first polarization and second set of beams having a second polarization;

said polarization conversion means further comprising a first lens array having a plurality of condenser lenses for condensing said collimated light from said source for said polarization converting means;

a positive lens and a second condenser lens array having a first set of lenses and a second set of lenses each having a same number of condenser lenses as said first lens array and each condenser lens of said second set of lenses having a half-wave plate; and said positive lens projecting said first set of beams with said first polarization to converge at said first set of lenses and said positive lens projecting said second set of beams with said second polarization to converge at said second set of lenses each with said half-wave plate, whereby said second set of lenses projecting collimated light with said first polarization therefrom.

2. The light distribution system of claim 1 wherein:

said polarization conversion means comprising a polarization beam splitter (PBS) for converting said collimated light projected directly from said light source into a first set of beams having a first polarization and second set of beams having a second polarization.

3. A method for receiving a collimated light into a light distribution system form a light source for distributing the light to an image display projector comprising:

disposing a polarization conversion means immediately next to said light source for receiving and converting said collimated light into a first set of beams having a first polarization and second set of beams having a second polarization;

disposing a first condenser lens array having a plurality of condenser lenses for condensing said collimated light from said light source for projecting to a polarization converting means;

disposing a second condenser lens array having a first set of lenses and a second set of lenses each having a same number of condenser lenses as said first lens array and each condenser lens of said second set of lenses having a half wave plate; and projecting said first set of beams with said first polarization from said positive lens to converge at said first set of lenses and projecting said second set of beams with said second polarization from said positive lens to converge at said second set of lenses with said half-wave plate whereby said second set of lenses projecting a collimated light with said first polarization therefrom.

4. The method of claim 3 wherein:

said step of disposing said polarization conversion means comprising a step of disposing a polarization beam splitter (PBS) for converting said collimated light projected directly from said light source into a first set of beams having a first polarization and second set of beams having a second polarization.

* * * * *